Sept. 26, 1967 C. THOMSON 3,343,652
CONVEYOR BELTS
Filed Jan. 7, 1966 4 Sheets-Sheet 1
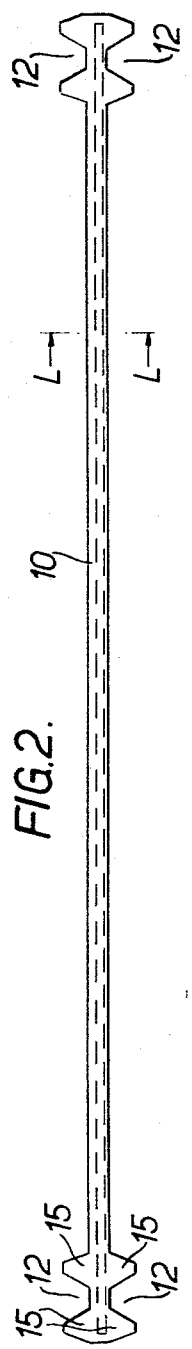
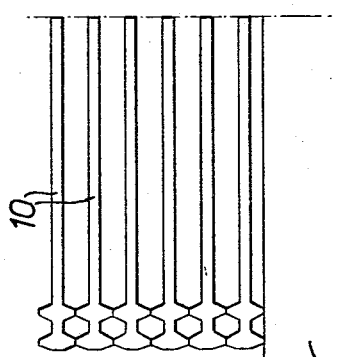
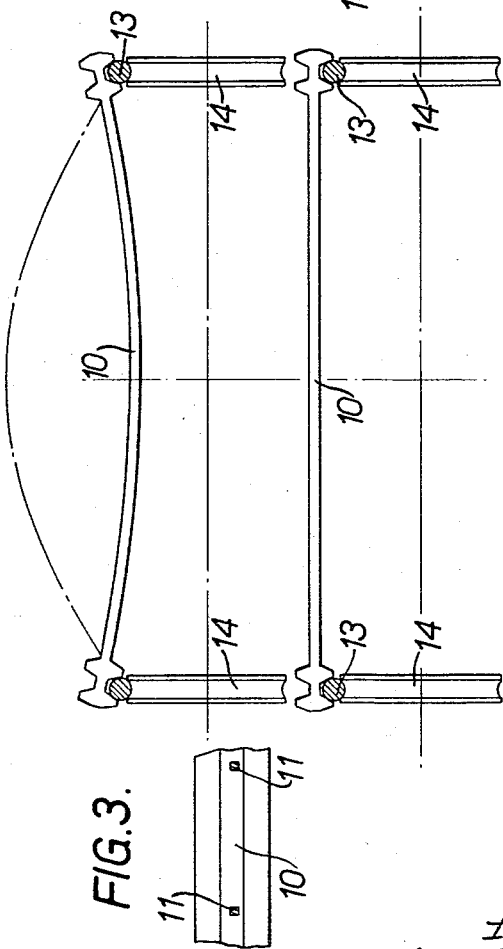
Inventor
Charles Thomson
By Stevens, Davis, Miller & Mosher
Attorneys Sept. 26, 1967
C. THOMSON
3,343,652
CONVEYOR BELTS
Filed Jan. 7, 1966
4 Sheets-Sheet 2
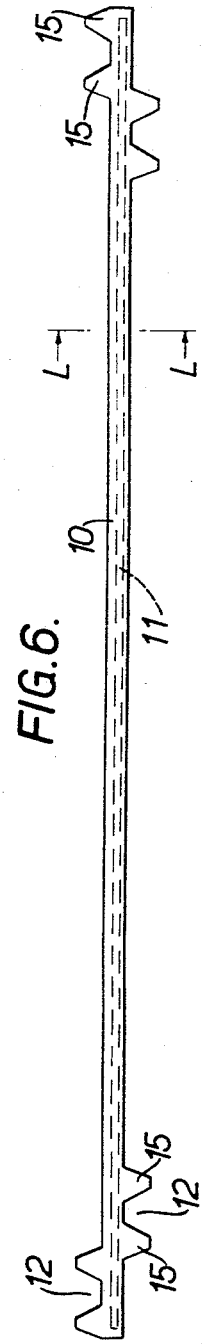
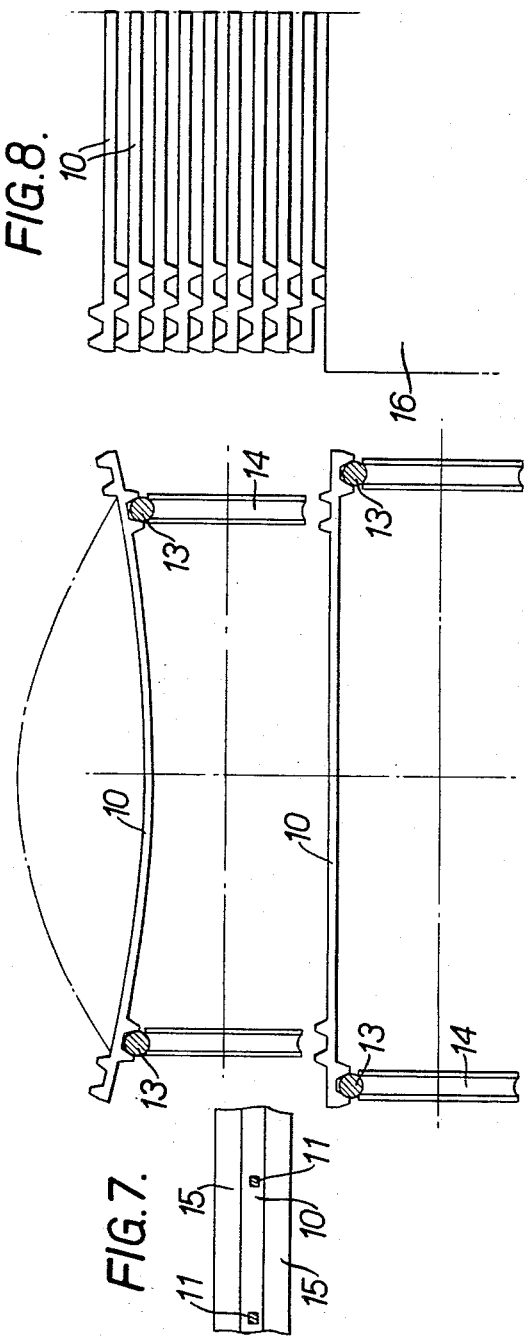
Inventor
Charles Thomson
By Stevens, Davis, Miller & Mosher
Attorneys

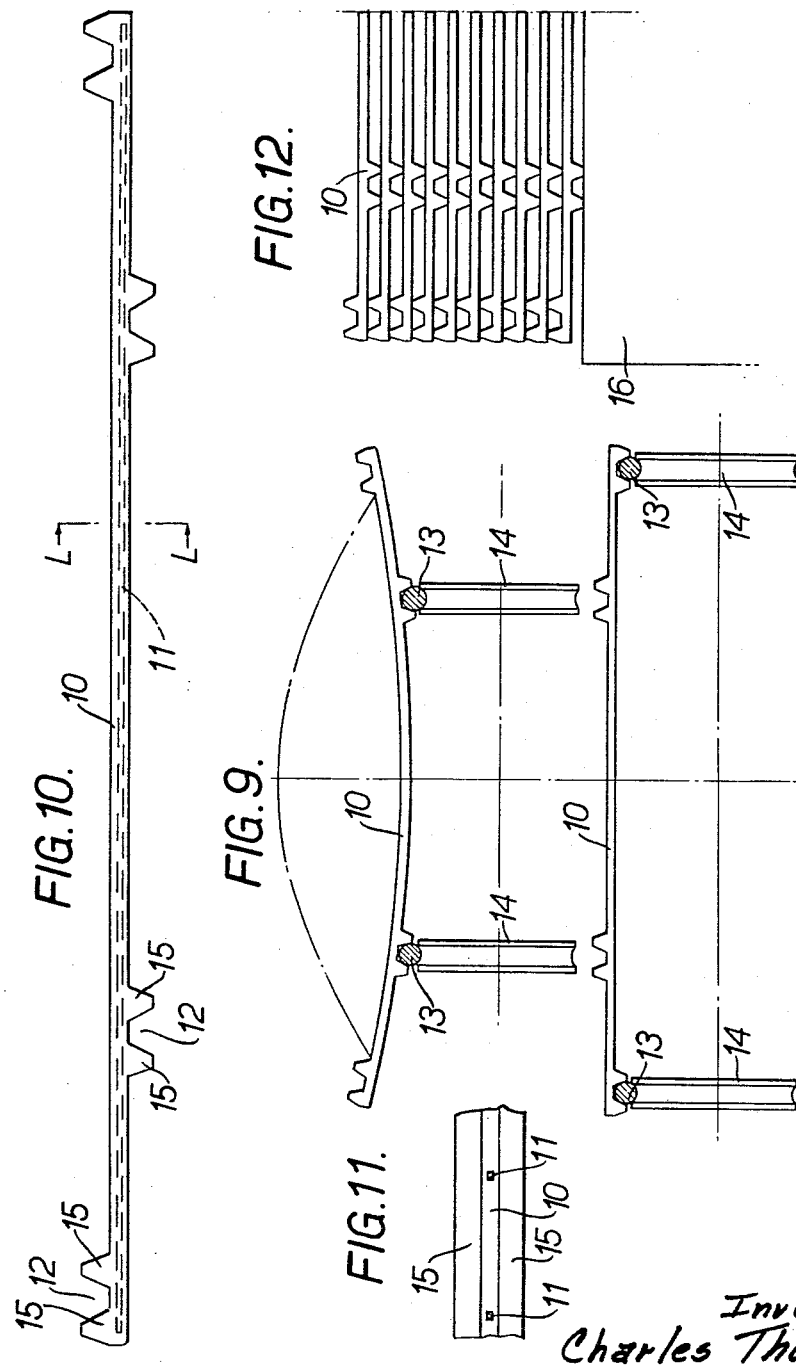

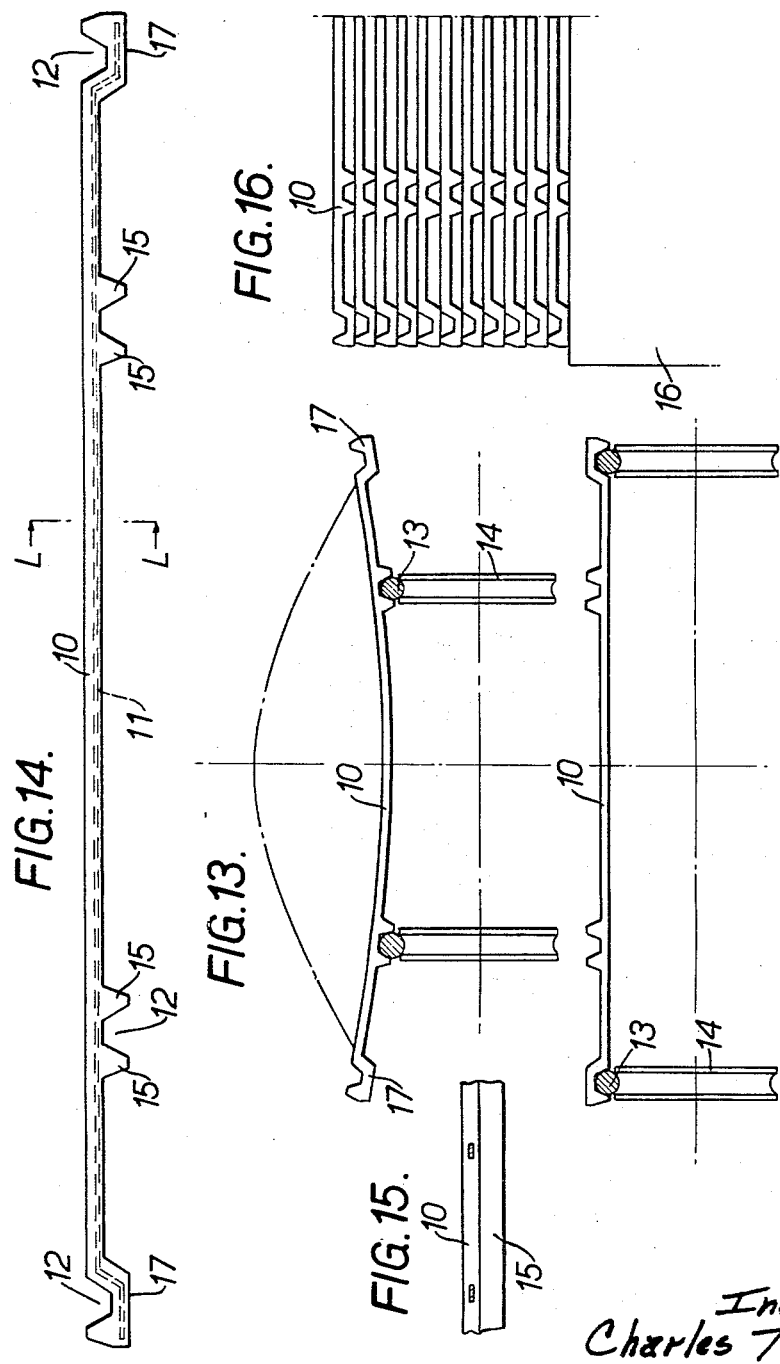

United States Patent Office 3,343,652
Patented Sept. 26, 1967

3,343,652
CONVEYOR BELTS
Charles Thomson, Esher, Surrey, England, assignor to Solar Thomson Engineering Company Limited, Cobham, Surrey, England
Filed Jan. 7, 1966, Ser. No. 519,378
Claims priority, application Great Britain, Jan. 12, 1965, 1,434/65
6 Claims. (Cl. 198—191)

This invention is concerned with conveyor belts for conveyors of the kind in which a conveyor belt is supported and frictionally driven by cables. The conveyor belt in such conveyors is customarily provided with guideways associated with opposite faces of the belt for locating the cables laterally relative thereto, so that the cables and belt are positively located laterally relative to each other both on the carrying run and on the return run of the belt, which guideways are formed by projections (e.g. longitudinal ridges) carried by the belt.

According to the present invention there is provided a conveyor belt for a conveyor of the kind referred to, which belt is provided with guideways associated with opposite faces of the belt for locating the cables internally relative thereto, said guideways being formed by projections carried by the belt, characterized in that the projections forming the guideways associated with each face of the belt are laterally off-set relative to the projections forming the guideways associated with the opposite face of the belt. With this arrangement, when the belt is coiled, e.g. for storage or transport, the various projections do not interfere with one another. Thus the diameter of the coil obtainable for a given length of belt is substantially less than if the projections were disposed opposite to one another as has been customary heretofore.

Said projections may project in opposite directions and preferably comprise longitudinal ribs defining cable-receiving grooves.

In another form of the invention, said projections may project in the same direction. In that case, preferably the projections comprise longitudinal ribs defining cable-receiving grooves associated with one face of the belt and channel-section longitudinal projections which provide cable-receiving grooves associated with the opposite face of the belt.

In one preferred arrangement the guideways associated with one face of the belt are substantially closer than the other guideways to the centre-line of the belt. In the carrying run of the belt, the guideways closer to the centre line of the belt are associated with the underneath face of the belt and the bending moment of the belt is thereby reduced.

The following is a description, by way of example, of a conveyor belt of known construction and three embodiments of the present invention. Reference is made to the accompanying drawings, in which:

FIGURE 1 is a cross-section of a conveyor of the kind referred to having a belt of known construction;

FIGURE 2 is a cross-section of the belt of known construction;

FIGURE 3 is a section on the line L—L of FIGURE 2;

FIGURE 4 is a radial section of part of the belt of FIGURE 2 coiled for transport or other purpose; and FIGURES 5 to 8, FIGURES 9 to 12 and FIGURES 13 to 16 are views corresponding to FIGURES 1 to 4 but illustrating three embodiments of the present invention.

In each construction shown in the drawings, the conveyor belt 10 is made of rubber or rubber-like material reinforced by fabric and by spring steel straps 11 embedded therein.

Referring to FIGURES 1 to 4, the known conveyor belt shown therein has straps 11 extending across the full width of the belt 10 and spaced about 3 or 4 inches apart longitudinally of the belt. The belt is provided with guideways in the form of grooves 12 at the edge of each face thereof to fit the driving ropes or cables 13 which run round pulleys 14. It will be seen that the straps have to be strong enough to support the load being conveyed over a span which is substantially equal to the belt width, say a span of 34 inches for a 36-inch wide belt. The grooves 12 are in pairs in which one groove is vertically above another, and are formed by continuous longitudinal ribs 15 projecting from the opposite face of the belt. Each rib 15 is therefore directly opposite to a rib projecting from the other face of the belt. Consequently, when the belt is coiled on a core 16 for transport (see FIGURE 4), the ribs engage on one another and the effective coiling thickness of the belt is equal to the thickness of the carcase body of the belt plus twice the height of each rib.

In the construction of FIGURES 5 to 8, the grooves 12 on opposite faces of the belt are off-set laterally, the grooves on one face being displaced inwardly from the other grooves. This arrangement has two results. Firstly, the span between the cables 13 on the carrying run is slightly reduced (the inwardly displaced grooves being on the underneath face of the belt in the carrying run), which reduces the bending moment. Secondly, when the belt is coiled, ribs on one face of the belt nest within ribs on the other face of the belt, giving a substantial reduction in the coiling diameter for a given length or a substantial increase in length for a given coil diameter. Ribs on opposite faces of the belt are in lateral engagement thus increasing the stability of the coil.

In the embodiment of FIGURES 9 to 12, the grooves 12 on one face of the belt are substantially closer than the grooves on the other face to the centre-line of the belt. Thus, the bending moment on the belt can be substantially reduced, while the advantage of reduction in coiling diameter is retained. The advantage of lateral engagement of overlapping ribs is lost, but this advantage can be recovered if two additional ribs are provided on one face of the belt.

In the construction of FIGURES 13 to 16, the grooves 12 opening to one face of the belt are provided by continuous longitudinal channel-section projections 17 which project from the other face of the belt. The straps 11 are cranked suitably. The grooves 12 on said other face of the belt are defined by ribs 15 and are spaced substantially closer than the projections 17 to the centre-line of the belt. Thus, the overall thickness of the belt is equal to the thickness of the belt carcase plus the depth of one groove only. Therefore, the advantages of reduction in bending moment and reduction in coiling diameter are retained while there is the further advantage that the overall depth of the belt section is reduced and consequently the stress in the rubber, polyvinyl chloride or other material of which the belt is made which arises when the belt passes over pulleys of small diameter is reduced. There is an additional advantage that the coil now has four points of support when resting on the ground, and it may be possible to dispense with the usual wooden reel.

If desired, the grooves on opposite faces of the belt may be staggered for only part of the width of a groove so that one rib of each groove fits between the two ribs of another groove.

I claim:
1. A conveyor belt adapted to be supported and frictionally driven by cables engaging the opposite faces of said belt, wherein the improvement consists of two longitudinally extending first projections extending from the load-carrying face of said belt adjacent each edge thereof, and two pairs of longitudinally extending additional pro- jections extending from the nonload-carrying face of said belt, said projections forming guideways for cables engaging the respective faces of the belt, said additional projections being sufficiently closer to the longitudinal central axis of the belt than said first projections to permit nesting of said additional projections between said first projections during coiling of the belt.

2. A conveyor belt according to claim 1 wherein said projections comprise longitudinal ribs.

3. A conveyor belt according to claim 1 wherein the guideways for the cables engaging one face of the belt are substantially closer to the center line of the belt than the guideways for the cables engaging the opposite face of the belt.

4. A conveyor belt according to claim 1 wherein said projections are formed in one piece with said belt.

5. A conveyor belt according to claim 1, wherein a plurality of resilient transverse reinforcing members extends laterally across the belt and between said cable guideways.

6. A conveyor belt adapted to be supported and frictionally driven by cables engaging the opposite faces of said belt, wherein the improvement comprises a plurality of longitudinal ribs and channel-section longitudinal projections extending from the same face of said belt, said ribs forming guideways for the cables engaging one face of the belt, and said projections forming guideways for the cables engaging the opposite face of the belt, said projections being laterally offset with respect to said ribs across the belt.

References Cited

UNITED STATES PATENTS

| 2,732,930 | 1/1956 | Thomson | 198—201 |
| 2,903,123 | 9/1959 | Naylor | 198—191 |

FOREIGN PATENTS

| 821,613 | 10/1959 | Great Britain. |
| 839,752 | 6/1960 | Great Britain. |

EVON C. BLUNK, *Primary Examiner.*

M. L. AJEMAN, *Assistant Examiner.*